United States Patent [19]
Hewitt et al.

[11] Patent Number: 6,151,651
[45] Date of Patent: Nov. 21, 2000

[54] COMMUNICATION LINK WITH ISOCHRONOUS AND ASYNCHRONOUS PRIORITY MODES COUPLING BRIDGE CIRCUITS IN A COMPUTER SYSTEM

[75] Inventors: Larry Hewitt; Dale E. Gulick, both of Austin, Tex.

[73] Assignee: Advanced Micro Devices, Inc., Sunnyvale, Calif.

[21] Appl. No.: 09/098,360

[22] Filed: Jun. 17, 1998

[51] Int. Cl.[7] .................................................. G06F 13/00
[52] U.S. Cl. ............................................................. 710/129
[58] Field of Search .................................. 710/128, 105, 710/129

[56] References Cited

U.S. PATENT DOCUMENTS

| | | | |
|---|---|---|---|
| 5,422,883 | 6/1995 | Hauris et al. | 370/62 |
| 5,450,411 | 9/1995 | Heil | 370/352 |
| 5,621,898 | 4/1997 | Wooten | 710/117 |
| 5,640,392 | 6/1997 | Hayashi | 370/395 |
| 5,742,847 | 4/1998 | Knoll et al. | 395/866 |
| 5,758,105 | 5/1998 | Kelley et al. | 395/293 |
| 5,761,430 | 6/1998 | Gross et al. | 395/200.55 |
| 5,761,448 | 6/1998 | Adamson et al. | 710/104 |
| 5,873,998 | 2/1999 | Chee . | |
| 5,948,080 | 9/1999 | Baker | 710/37 |

OTHER PUBLICATIONS

Intel Corporation, "Accelerated Graphics Port Interface Specification", Revision 1.0, Jul. 31, 1996, pp. 1–152.

Wickelgren, Ingred J., "The Facts About Fire Wire", Apr. 1997, pp. 20–25.

Glaskowsky, Peter N., "Cyrix Creates Ultimate CPU for Games", Microdesign Resoures, Dec. 8, 1997, pp. 16–18.

Gwennap, Linley, "MediaGX Targets Low–Cost PCs", Microprocessor Report, vol. 11, No. 3, Mar. 10, 1997, pp. 1–6.

Compaq, Digital Equipment Corp., IBM PC Company, Intel, Microsoft, NEC, and Northern Telcom, "Universal Serial Bus Specification", Revision 1.0, Jan. 15, 1996, pp. 3–268, particularly Chapters 4 and 5.

*Primary Examiner*—Glenn A. Auve
*Attorney, Agent, or Firm*—Zagorin, O'Brien & Graham, LLP

[57] ABSTRACT

A computer system includes a first processor integrated circuit. A first bridge integrated circuit is coupled to the processor via a host bus. The computer system includes an interconnection bus that couples the first bridge circuit to a second bridge circuit. The interconnection bus provides a first transfer mode for asynchronous data and a second transfer mode for isochronous data. The interconnection bus provides for a maximum latency and a guaranteed throughput for asynchronous and isochronous data.

24 Claims, 14 Drawing Sheets

COMMUNICATION LINK WITH ISOCHRONOUS AND ASYNCHRONOUS PRIORITY MODES COUPLING BRIDGE CIRCUITS IN A COMPUTER SYSTEM

CROSS REFERENCE TO RELATED APPLICATIONS

This application relates to co-pending application Ser. No. 09/098,876, filed Jun. 17, 1998, entitled WRITE ONLY BUS WITH WHOLE AND HALF BUS MODE OPERATION, by Larry Hewitt; application Ser. No. 09/099,227, filed Jun. 17, 1998, entitled METHOD OF MODE CONTROL IN A BUS OPTIMIZED FOR PERSONAL COMPUTER TRAFFIC, by Larry Hewitt, now U.S. Pat. No. 6,032,211; co-pending application Ser. No.09/098,854, filed Jun. 17, 1998, entitled A BUS OPTIMIZED FOR PERSONAL COMPUTER TRAFFIC, by Larry Hewitt and Dale E. Gulick; and co-pending application Ser. No. 09/099,228, filed Jun. 17, 1998, entitled CPU-NORTH BRIDGE INTEGRATION UTILIZING AN INTERCONNECTION BUS PROVIDING A HIGH SPEED-LOW PIN COUNT LINK, by Dale E. Gulick and Larry Hewitt, which applications are incorporated herein by reference.

BACKGROUND OF THE INVENTION

1. Field of the Invention

The invention relates to computer systems and more particularly to a computer system including a bus having a relatively high bandwidth and a relatively low pin count.

2. Description of the Related Art

Traditional personal computer architectures partition the computer system into the various blocks as shown in FIG. 1. The central feature of this prior art architecture is the use of the Peripheral Component Interface (PCI) bus 101 as the connection between the "north bridge" integrated circuit 103 and the "south bridge" integrated circuit 105. The north bridge functions generally as a switch connecting CPU 107, a graphics bus 109 such as the Advanced Graphics Port (AGP) bus, and the PCI bus to main memory 111. The memory controller function is also located in the north bridge.

The south bridge generally provides the interface to the input/output (I/O) portion of the system with the exception of video output as illustrated in the prior art computer architecture shown of FIG. 1. Specifically, the south bridge 105 provides a bridge between the PCI bus and legacy PC-AT (Advanced Technology) logic. The south bridge also provides a bridge to the legacy ISA bus 115, the Integrated Device Electronics (IDE) disk interface 117 and the Universal Serial Bus (USB) 119. The various busses and devices shown in FIG. 1 are conventional and are not described further herein unless necessary for an understanding of the present invention.

In the illustrated prior art architecture, the PCI bus between the north bridge and the south bridge also functions as the interconnect bus for many add-in functions. That results in a significant number of pins on the north bridge circuit 103 and the south bridge circuit 105 to account for the add-in functions. That also results in a lack of determinism in the system because any function on the PCI bus can become master of the bus and tie up the bus. Ideally, communication between the CPU and the resources in the south bridge, or between the resources in or coupled to the south bridge and system memory 111 should be deterministic in the sense of knowing what throughput is available for a particular transfer and the latency that is involved for that transfer.

It would be desirable to have a deterministic system for the major interconnect bus and in addition to reduce the pressure for additional pins on the integrated circuits making up the computer system.

SUMMARY OF THE INVENTION

Accordingly, the invention provides a computer architecture that includes a new interconnect bus between the north bridge and the south bridge integrated circuits. As part of the new architecture, the PCI bus no longer connects to the north bridge integrated circuit.

In one embodiment, the invention provides a computer system that includes a first processor integrated circuit. A first bridge integrated circuit is coupled to the processor via a host bus. The computer system includes an interconnection bus that couples the first bridge circuit and a second bridge circuit. The interconnection bus provides a first transfer mode for asynchronous data and a second transfer mode for isochronous data. The interconnection bus provides for a maximum latency and guarantees a minimum throughput for isochronous and asynchronous data.

In another embodiment a method of communicating information in a computer system is provided. The computer system includes a processor coupled to a first (north) bridge integrated circuit by a host bus and an interconnection bus connecting a second (south) bridge integrated circuit to the first (north) bridge integrated circuit. The interconnection bus provides a first transfer mode for asynchronous data and a second transfer mode for isochronous data on the interconnection bus. Data is transmitted between the first bridge integrated circuit and the second bridge integrated circuit in either the first or the second transfer modes via the interconnection bus.

BRIEF DESCRIPTION OF THE DRAWINGS

The present invention may be better understood, and its numerous objects, features, and advantages made apparent to those skilled in the art by referencing the accompanying drawings.

DESCRIPTION OF THE PREFERRED EMBODIMENT(S)

Figure 1:
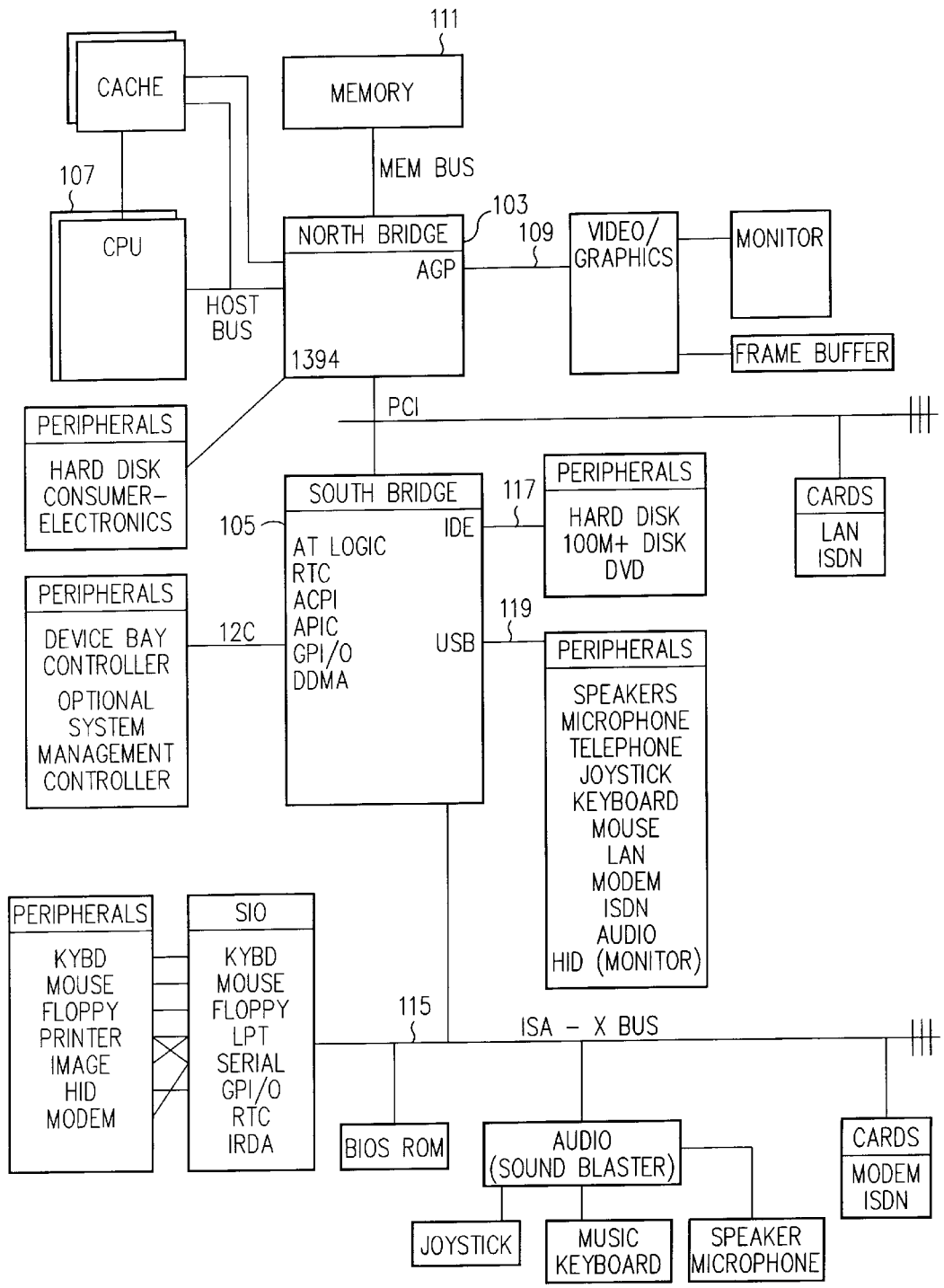
FIG. 1 depicts a prior art personal computer architecture.
Figure 2:
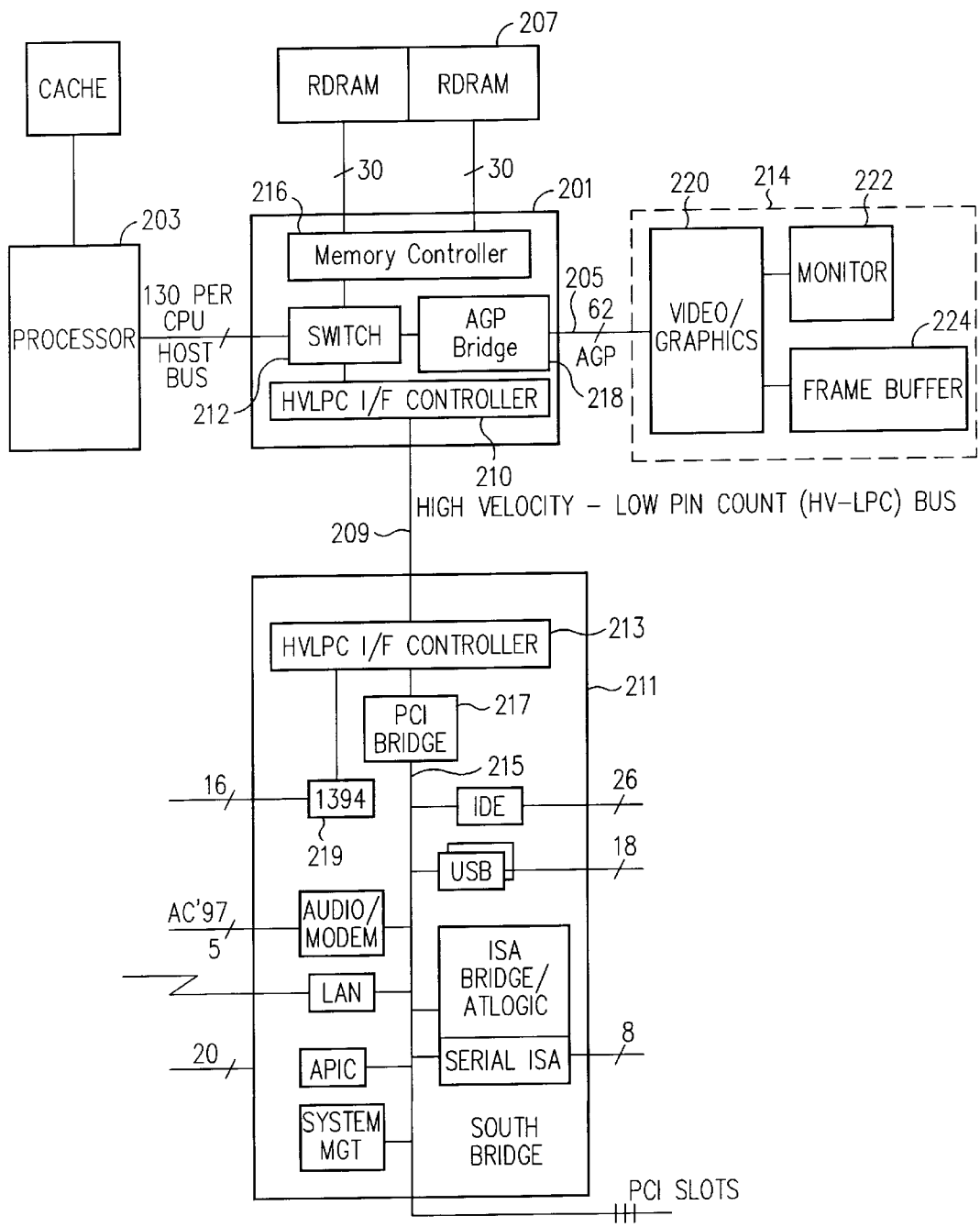
FIG. 2 depicts a first embodiment of the invention showing a point-to-point interconnect between the north bridge and the south bridge.

Referring to FIG. 2 a computer system according to one embodiment of the present invention includes north bridge integrated circuit 201 coupled between processor integrated circuit 203, system memory 207, graphics subsystem 214 and south bridge integrated circuit 211. The processor 203 may include both a processor core and other functions such as cache memory. In the illustrated embodiment, the system (or main) memory shown in FIG. 2 utilizes Rambus dynamic random access memory (RDRAM) to provide fast DRAM access. The graphics subsystem is shown coupled to the north bridge integrated circuit via an accelerated graphics processor (AGP) bus. The graphics subsystem includes a graphics controller circuit 220, monitor 222 and frame buffer 224. Graphics controller circuits are known in the art. One example is the Intel 740 Graphics Accelerator integrated circuit. Other graphics buses beside the AGP may of course be utilized.

The north bridge integrated circuit 201 provides a switching function connecting processor 203, graphics bus 205, memory 207, and interconnect bus 209. The interconnect bus replaces the PCI bus shown in the prior art computer architecture. The interconnect bus 209 has a high speed relative to the PCI bus and a relatively low pin count. The interconnect bus is also referred to herein as the high velocity—low pin count (HV-LPCP). System memory 207 and AGP bus 205 are coupled to the switch through memory controller 216 switch and AGP bridge circuit 218 respectively. Interconnect bus interface bus interface 210 (HV-LPC I/F) provides an interface to interconnect bus 209 for those circuits coupled to switch 212.

The south bridge integrated circuit 211 provides a bridge between interconnect bus 209 and PCI bus 215 through PCI bridge 217. The south bridge 211 also provides a bridge to the 1394 bus through the 1394 interface circuit 219. Other functions that are also accessible through the PCI bus include IDE, Universal Serial Bus (USB), Industry Standard Architecture (ISA) bridge and Advanced Programmable Interrupt Controller (APIC).

One main feature of the architecture shown in FIG. 2 is that bus 209 provides a guaranteed minimum bandwidth and a maximum latency to data transferred over the bus. That is accomplished, as described further herein, by transferring data over the interconnect bus in frames, with each frame guaranteeing a portion of the frame for isochronous data and a portion of the frame for asynchronous data.

Guaranteeing maximum latency for various channels connected to the bus is becoming more important as isochronous data streams are being conveyed between the south bridge and main memory. One source of such isochronous data is the IEEE 1394 bus.

Another feature of the architecture shown in FIG. 2 is that the PCI bus function has moved to the south bridge. The HV-LPC link 209 provides the PCI-resident functions all of the bandwidth that existed in the old architecture, and also provides additional capacity for new functions such as the 1394 bus. Note that the 1394 bus can cause as big a load on the system as the PCI bus. That implies that the interconnect bus must be high speed relative to at least the PCI bus.

One way to achieve a high speed bus is to utilize a point-to-point bus in which only two devices are present on the bus. A point-to-point bus can inherently run at higher speeds than a multi-drop bus such as the PCI bus since a point-to-point link has reduced electrical loading and reduced noise caused by reflections at tap points such as connectors. It is possible to provide a point to point link that operates at 25 times the speed of the PCI bus. Given this, the 32-bit wide PCI bus can be replaced by a 16-bit (or even an 8-bit link) while adding significant bandwidth.

Figure 3:
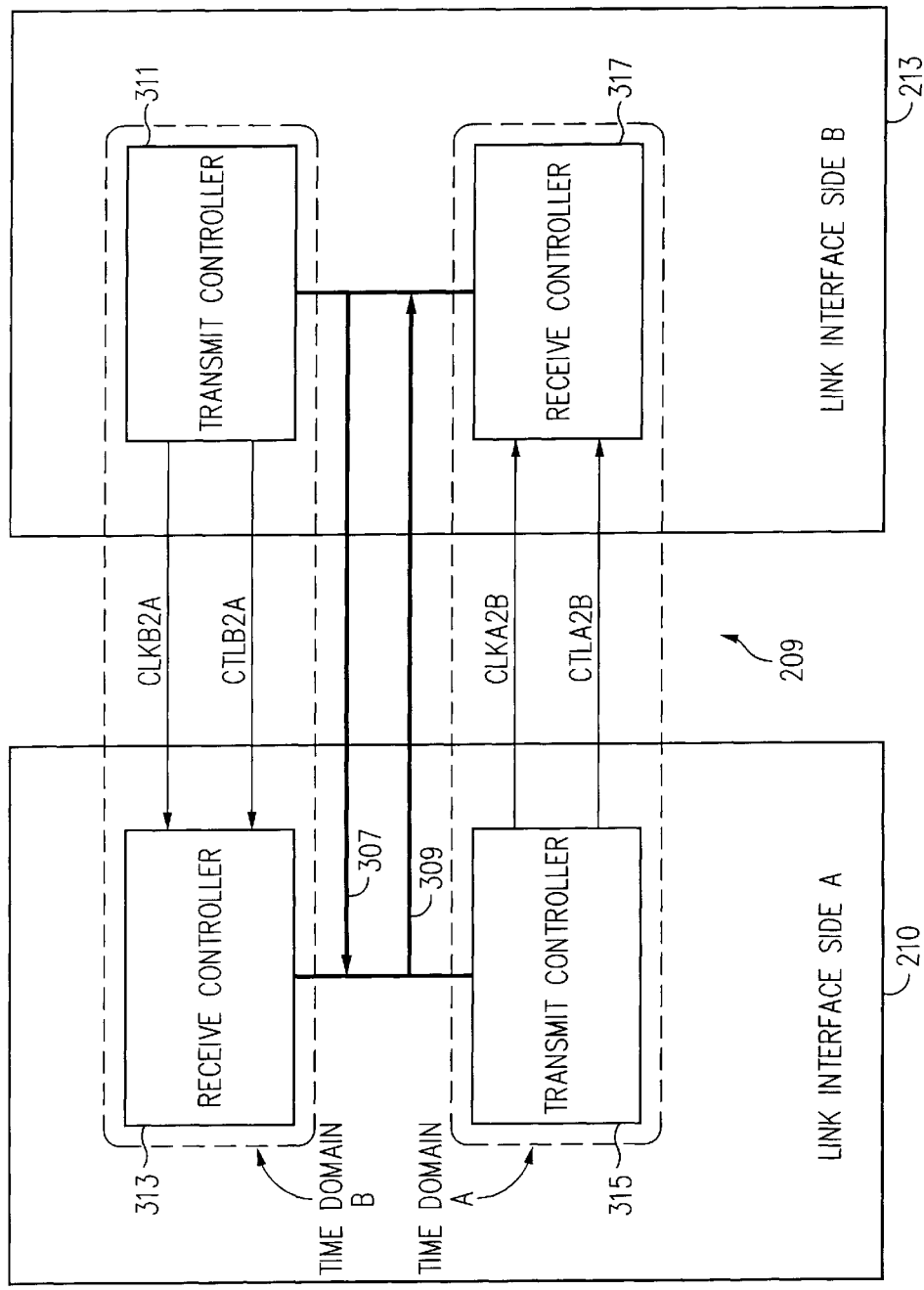
FIG. 3 shows further details of the interconnect bus and the bus interfaces.

The interconnect bus 209 will now be described in greater detail. Referring to FIG. 3 bus 209 which connects a first module (which may be a processor module on a north bridge as described further herein) and the interface module, includes bi-directional data portions 307 and 309. In one embodiment, each data portion contains one byte (8 bits) of data. However, the number of bits on the data bus may be of size $(2^n-1:0)$, where n is an integer>0 that meets the throughput requirements of the system. Thus, a minimum implementation may have one data bit in each direction. In the illustrated embodiment, n equals 4, with each data portion having one byte.

Referring to FIG. 2 and FIG. 3, the bus interface 210 in north bridge 201 is arbitrarily designated side A and the bus interface 213 in south bridge 211 is designated as side B. Bus 209 includes a unidirectional clock line CLKB2A and a unidirectional control line CTLB2A provided by bus interface 210 to bus interface 213. The "B2A" designation indicates that the signal is an output of side B and an input to side A. Bus 209 also includes a second unidirectional clock line CLKA2B and a second unidirectional control line CTLA2B, which are provided by side A to side B. The "A2B" designation indicates that the signal is an output of side A and an input to side B. The protocol uses clock-forwarding technology to reliably synchronize source data to a clock. CLKA2B and CLKB2A are preferably derived from the same source such that they are the same frequency and they do not drift.

Each bus interface side includes a transmit controller and a receive controller. Data always flows from the transmit controller on one side to the receive controller on the other side. Thus, side A bus interface 210 in north bridge 201 includes transmit controller 315 and a receive controller 313. Side B bus interface 213 in south bridge 211 includes transmit controller 311 and receive controller 317. The two bi-directional portions 307 and 309 of the data bus are shown with arrows indicating their default direction of transfer. Data bus portion 307 transmits data in a default mode of operation, from transmit controller 311 to receive controller 313 (from side B to side A) synchronous with CLKB2A. Data portion 309 of the data bus is dedicated, in a default mode of operation to transmit data from transmit controller 315 to receive controller 317 (side A to side B), synchronously with CLKA2B. In the illustrated embodiment, bus 209 is a point to point bus physically connecting precisely two integrated circuits. In that way, transfer speed across the bus may be maximized. However, some embodiments of the bus may connect more than two integrated circuits to the bus.

The side A transmit controller delivers clock CLKA2B to the side B receive controller, and the side B transmit controller delivers clock CLKB2A to the side A receive controller. Thus, the side A transmit controller and side B receive controller are included in the same time domain, called time domain A, and the side B transmit controller and the side A receive controller are included in the same time domain, called time domain B.

In the illustrated embodiment, both side A and side B initialize to a mode of 16 bits wide and 800 megahertz data rate. The data rate is based on a clock (CLK) (meaning CLKA2B and CLKB2A) rate of 400 megahertz and the data is provided on each edge of the clock. So, if clock is 400 megahertz, this represents 800 million edges per second. Address phases and data phases of bus cycles transfer information at each edge of CLK. Thus, the edge rate of CLK specifies the maximum theoretical bandwidth of the bus rather than the cycle rate.

Two kinds of traffic occur over bus 209: bus cycles and messages. The greatest amount of bandwidth is used by bus cycles, which are transfers of blocks of addressing information or addressing information and associated data sent from one link layer to the link layer on the other side. The addressing information determines where in the integrated circuit a particular access is targeted. A bus cycle may be a long or short bus cycle. A long bus cycle may utilize several hundred nanoseconds of bus time while a short bus cycle uses less than, e.g., 20 or 30 nanoseconds. The second type of bus traffic is messages, which are used to send protocol information across the link. In one embodiment, messages are aligned to the rising edge of CLK and consume one CLK cycle and can occur at any time, including in the middle of bus cycles. In other embodiments, messages may last more than one cycle.

Figure 4:
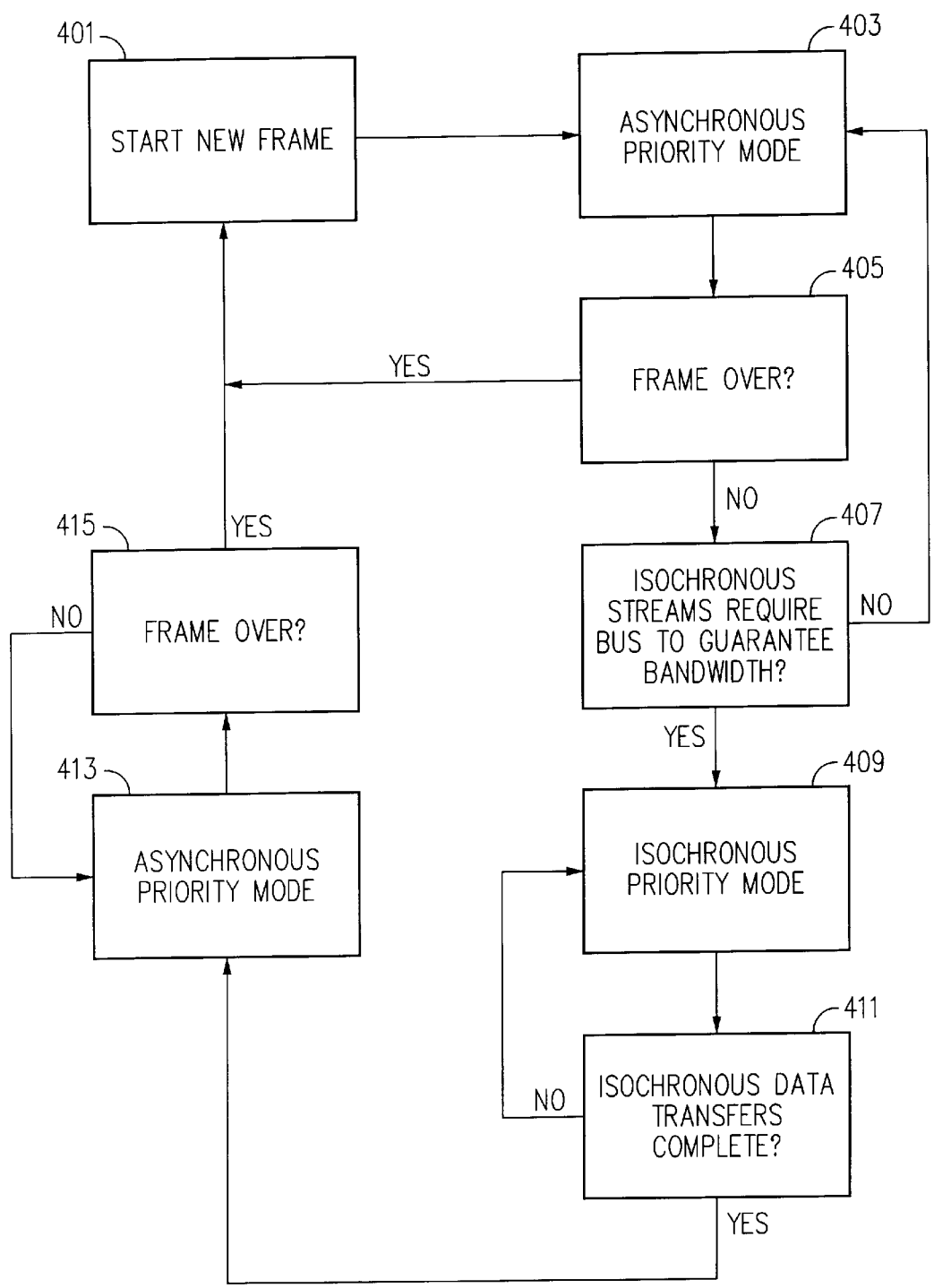
FIG. 4 illustrates a flowchart for determining when to enter isochronous priority mode.

In order to provide the necessary isochronous bandwidth on the bus for isochronous streams, the isochronous streams are guaranteed a specified amount of bandwidth during each frame on the bus. In the illustrated embodiment, frames are 2 microseconds in length. Referring to FIG. 4, a flowchart illustrates one method of guaranteeing sufficient isochronous bandwidth according to the present invention. Initially during the frame, asynchronous transfers are granted priority over isochronous transfers (to minimize the latency of the asynchronous transfers), which is called asynchronous priority mode. Thus, at the start of each new frame 401, the bus enters asynchronous priority mode at 403. In asynchronous priority mode, asynchronous transfers will be transferred instead of isochronous transfers if there are asynchronous requesters for the bus. However, isochronous data may be transferred when the bus is in asynchronous priority mode when there is no asynchronous data to transfer. If the frame is not over at 405, step 407 determines whether it is necessary to start transferring only isochronous data (isochronous priority mode) to guarantee sufficient bandwidth is provided for isochronous data. If so, the bus switches to isochronous priority mode in step 409. The bus stays in isochronous priority mode until all isochronous transfers are complete. There is preferably some cushion factored into the isochronous determination in step 407 so that there is at least some time left in the particular frame after all isochronous data is transferred. After transferring all isochronous data, the bus returns to asynchronous priority mode at 413 until the frame is over at 415. It is possible for the bus to stay in asynchronous priority mode the entire frame without switching to isochronous priority mode as is described further herein.

The bus 209 is very useful in situations where high-bandwidth asynchronous traffic must be mixed with isochronous traffic. The bus protocol assumes (1) that system performance is adversely affected by the latency of asynchronous traffic, (2) asynchronous traffic can be delayed indefinitely without adversely affecting real-time data streams, (3) isochronous traffic must be guaranteed a specified amount of bandwidth and worst-case latency, and (4) as long as the bandwidth and latency requirements for isochronous traffic are met, then the latency between their requests and the transfer of the data has no adverse affect on system performance.

The hardware on each side of the bus includes a physical layer, a protocol layer, and a link layer. The protocol layers for both sides of the bus include the same hardware elements. In this way, the bus is symmetrical with no centralized resources (as opposed to, for example, the PCI bus arbiter which in prior art systems was typically located in the north bridge of the PCI bus and arbitrates for all masters).

Figure 5:
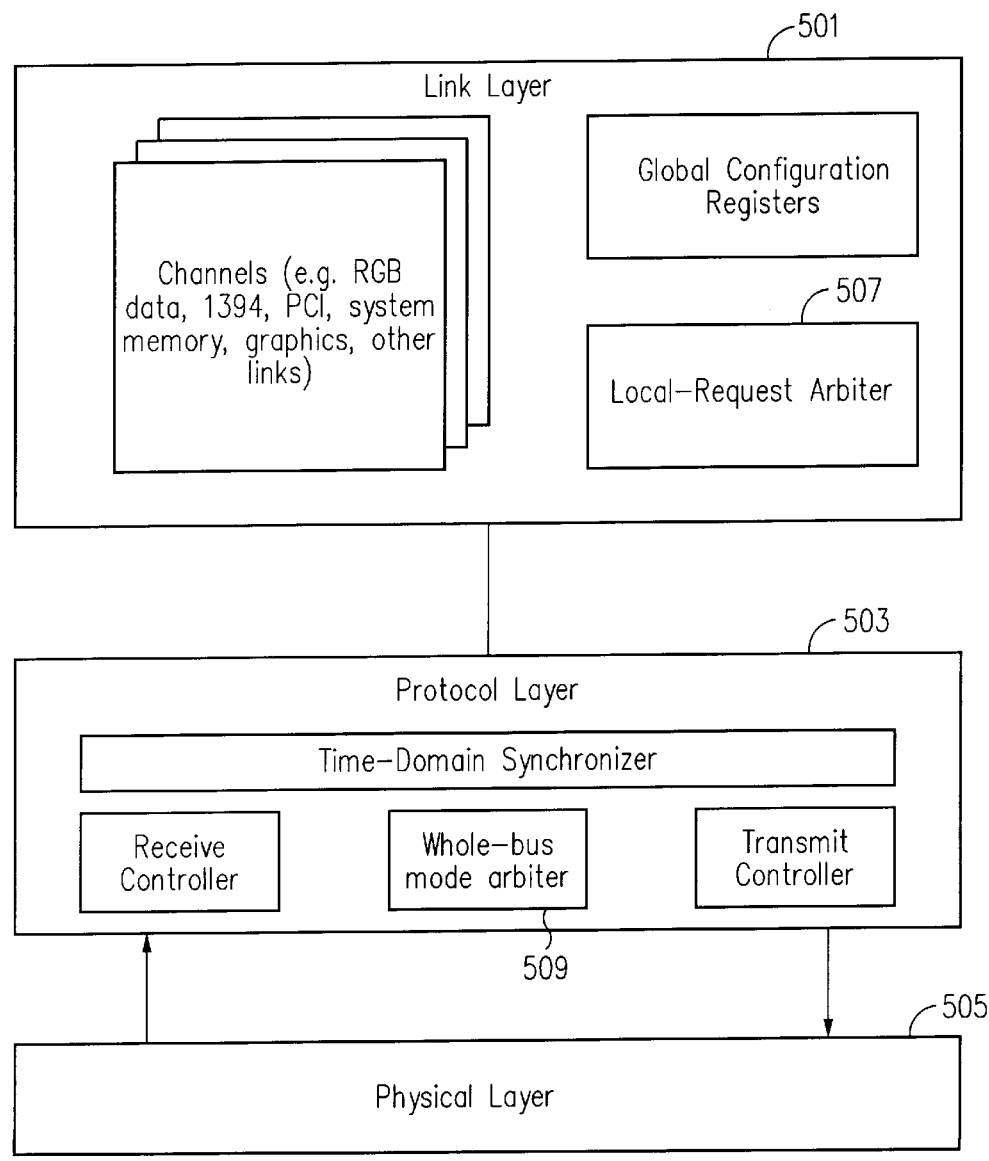
FIG. 5 illustrates the link layer, protocol layer and physical layer of the bus.

Referring to FIG. 5, the bus includes link layer 501, protocol layer 503, and physical layer 505. The physical layer will depend on such factors as the frequency of the bus, the number of devices on the bus, the length of the bus, as is known to those of skill in the art. The specification for the physical layer and the protocol layer is generally device independent, except for variations of the bus width and frequency. The specification for the link layer varies based on the requirements of the device.

In the illustrated embodiment, there may be one channel in the link layer for each functional unit connected to the bus. For example, referring again to FIG. 2, north bridge 201 may include three channels which are coupled to the bus interface 210 through switch 212. One channel is for processor 203, one for main memory 207, and one for the graphics subsystem 214. The corresponding south bridge 213 may include two channels: one for the 1394 interface and one for one for the PCI bus. In addition, additional channels may be provided for the USB because it has isochronous data, and/or for an IDE interface, and one for an expansion bus interface. The link layer also includes an arbiter 507 to determine the source of the next locally-generated bus cycle since there are typically multiple asynchronous and isochronous sources. The arbiters guarantee bandwidth to isochronous streams (within a maximum latency) while minimizing latency to asynchronous accesses.

Figure 6:
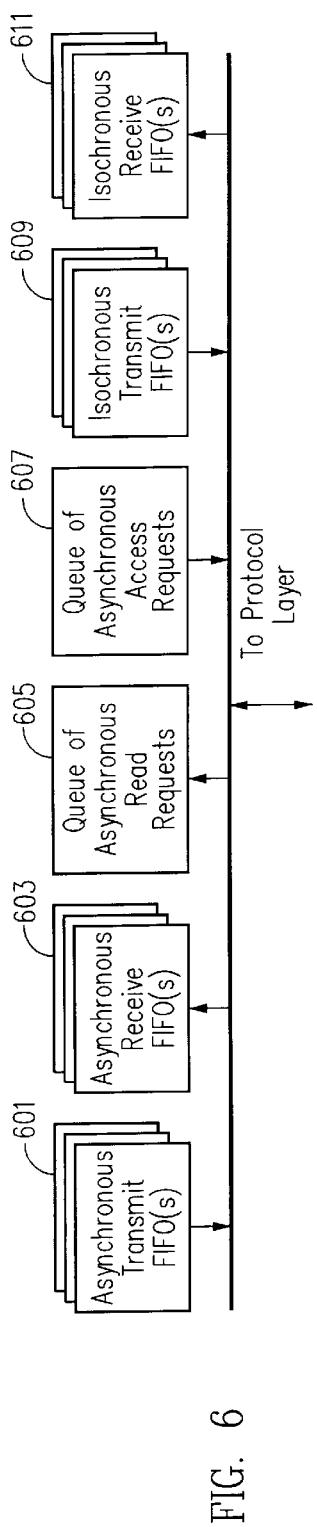
FIG. 6 illustrates one channel of the link layer.

Referring to FIG. 6 a typical channel in the link layer is shown. Each channel in the link layer includes FIFOs and queues of addressing information and data that have been sent across the bus or that will be sent across the bus. Thus, in FIG. 6 asynchronous transmit FIFO(s) 601 store asynchronous data that will be sent across the bus while asynchronous receive FIFO(s) 603 store asynchronous data received from the protocol layer. The channel shown in FIG. 6 also includes queues of asynchronous read requests 605 and access requests 607. Isochronous transmit and receive FIFO(s) 609 and 611 respectively store isochronous information for transmitting and store isochronous information that has been received.

The link layer hardware, unlike the protocol layer, is specific to the requirements of the local integrated circuit on which the link layer is implemented. FIFOs and queues are designed to the specific requirements of the channels being serviced by the link. Generally, the FIFOs of each channel are optional, based on the channel requirements. For example, one would not expect any isochronous transmit or receive FIFOs for the south bridge's PCI block, since the PCI protocol does not allow for guaranteed isochronous data transfers (although, nothing prevents a designer from including these for the PCI bus channel). The 1394 FIFO, on the other hand would expect to have both isochronous transmit and receive FIFOs. It is also possible in certain situations that there may be only a single receive FIFO and potentially no transmit FIFOs at all.

FIFOs utilized in the link layer are designed with the following considerations in mind. The FIFO may contain isochronous or asynchronous data; the FIFO may transmit data to the bus or receive data from the bus; the FIFO has a predetermined size (in bytes); the FIFO may be a master (controlled by local timing) or a slave (responding only to accesses); if a FIFO is a slave, then design considerations include what causes the slave FIFO to be loaded. The FIFO target address may be static or it may increment with each byte, in which case it will be reloaded periodically.

The size of the isochronous FIFOs can be determined according to the following equation: (maximum required bandwidth in bytes per second)×(frame time in seconds)×2. For example, to support a 600 megabyte per second data stream, the FIFO would be required to be 2400 bytes deep.

The processor module's system memory channel has special requirements, since multiple streams from the interface module may attempt to access it. It requires several isochronous transmit and receive FIFOs and, potentially, multiple asynchronous FIFOs.

There are special design considerations for the system memory channel because it is required to connect to widely varying interface module channels on the other side of the bus. So the system memory channel may include a 2× bandwidth RAM and an array of programmable head and tail pointers for various FIFOs. A typical implementation may include a 4K byte block of SRAM and 16 head and tail pointer pairs. Software configures these based on the channel requirements on the other side of the link.

As previously mentioned a bus cycle is defined as a block transfer of either addressing information by itself or addressing information followed by data. The address phase of a bus cycle transmits the addressing bytes over the link and the data phase, if there is one, transmits the associated data bytes over the link. The bus is write only in that reads are accomplished by (1) sending a read request from a first side to the second side, after which, (2) the read data is retrieved and, in a separate cycle, sent from the second side to the requesting side. Bus cycles are granted to either asynchronous or isochronous requesters. Requesters are link-layer devices that are currently requesting use of the link for a bus cycle.

The address phase occurs at the beginning of each bus cycle and typically includes the type of bus cycle being transmitted, the number of bytes to be transmitted in the bus cycle, bus-specific cycle type and address and whether both halves of the bus are requested for the transfer. There are several types of cycles in one embodiment as illustrated in Table 1.

TABLE 1

Cycle Types

| Cycle type | Description |
| --- | --- |
| Asynchronous read request | Send request to read data from one side to another |
| Asynchronous read response | Send requested data back across the bus |
| Asynchronous write request | Send address and data from one side to another |
| Asynchronous write response | Acknowledgment back to initiator of write that data has been received |
| Isochronous read request | Send request to read data from one side to another |
| Isochronous read response | Send requested data back across the bus |
| Isochronous write | Send address and data from one side to another |

In a default mode of operation, the data bus of the illustrated embodiment is split in half, with the 8 least significant bits (LSBs) of each 16-bit block controlled by the side A time domain and the 8 most significant bits (MSBs) of each 16-bit block controlled by the side B time domain. However, the bus protocol allows one side to utilize both halves of the bus to transmit data. The "local half-bus" refers to the half of the bus that is defaulted to be owned by the local transmit controller on an integrated circuit (LSBs for side A and MSBs for side B). The "external half-bus" refers to the other half of the bus, the half that is defaulted to be owned by the transmit controller on the other side of the link.

Thus, the protocol layer includes an arbiter (509 in FIG. 5), called the whole-bus mode arbiter, for the local half-bus to determine if it will be used to transmit data (default mode) or if it will be used to receive external data. Half-bus mode refers to the default state of the link, in which side A controls the LSBs and side B controls the MSBs in the illustrated embodiment. Whole-bus mode refers to the state in which both halves of the data bus have been granted to a transmit controller. The whole-bus mode arbiter only determines when to enter whole-bus mode. Arbitration for a locally-initiated bus cycle is handled via the link layer by the local request arbiter.

Short bus cycles (e.g., accesses that consume 20 nanoseconds of bus time or less, while only using half the data bus) are completed solely on the local half-bus. Long accesses (e.g., longer than 30 nanoseconds) may utilize several hundred nanoseconds of bus time, and start by sending data over local half-bus. While data is being transferred, arbitration for the external half-bus occurs (determining if there are local requesters), and then once the external half-bus is granted, the whole bus is utilized for the remainder of the bus cycle's transfers. Short bus cycles are allowed to complete without being halted. Long bus cycles can be halted for higher-priority traffic and then re-started at a later time.

Figure 7:
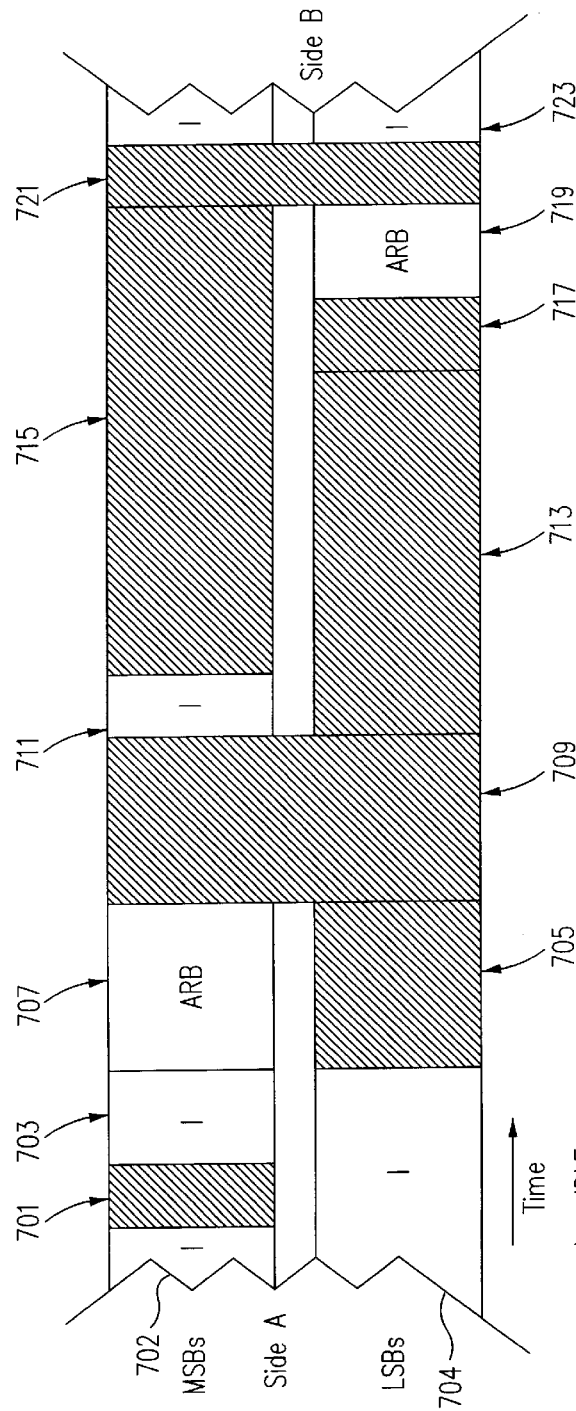
FIG. 7 illustrates the whole and half bus modes on the bus according to one embodiment of the invention.

Referring to FIG. 7, typical traffic over the bus 109 in whole and half-bus mode is illustrated. The side B half-bus, transferring data from side B to side A is shown at 702. The side A half-bus, transferring data from side A to side B is shown at 704. In the illustrated embodiment, all short bus cycles (e.g., accesses that consume 30 nanoseconds of bus time or less) utilize only half-bus mode. Thus, the short cycle shown at time period 701 which transfers data from side B to side A, is completed solely on the local half-bus. During time period 703, both halves of the bus are idle as indicated by the "I". At the beginning of time period 705, side A begins a long access, which as described, may utilize several hundred nanoseconds of bus time. Initially, during the long access, A transfers data only on the local half-bus. However, while data is being transferred, side B's whole-bus mode arbiter determines whether to grant its half-bus to the external controller during time period 707. Since side B is not using its local half-bus at this time, it grants its use to side A and the long cycle is completed in whole bus mode during time period 709. Thus, the bus is able to exploit idle time by granting use of an idle half-bus to a requesting half bus with a long transfer. Once the half-bus is granted by side B, the whole bus is utilized for the remainder of side A's bus cycle.

During time period 713, side A executes another long cycle transferring data from side A to side B. A side B long cycle begins during time period 715. During time period 717, side A's long cycle 713 has been completed and a short cycle from side A to side B occurs. Once that short cycle completes, side A is available to side B. The arbitration for side A's half-bus occurs during time period 719. Side A grants its half-bus to side B which causes the bus to switch to whole bus mode. The cycle completes in whole bus mode during time period 721. Once the bus cycle is complete, the bus again enters half-bus mode at 723.

In certain embodiments, all initiated bus cycles over the bus are allowed to complete without interruption. If, during the transmission of data, the bus enters whole-bus mode, then it will stay in that mode until the bus cycle is completed. Both side A and side B keep track of the number of bytes being transmitted and when the bus cycle is complete, both sides resume half-bus mode as shown at 711. In other embodiments, as described further herein, bus cycles may be interrupted and entering and leaving whole-bus mode differs according to whether the bus is operating in isochronous or asynchronous priority mode.

Maximum bandwidth requirements are specified for each isochronous stream in terms of bytes per frame. The sum of the isochronous-stream maximum-bandwidth requirements must be less than the theoretical total bandwidth. However, as a matter of practicality, the higher the percentage bandwidth of isochronous streams, the greater the probability that asynchronous traffic will incur latency. In the design of a balanced system, one expects the sum of typical asynchronous bandwidth and maximum isochronous bandwidth to be less than about 60 to 80 percent of the theoretical maximum bandwidth. If that is done, then average latency for asynchronous cycles will be minimized.

Isochronous requesters should not send more bytes across the link, during a frame, than the programmed maximum bandwidth for that requester. Hardware may be implemented in the link layer to ensure that isochronous requesters comply with that requirement.

As discussed, in one embodiment, bus traffic is grouped into 2-microsecond frames. Two counters associated with frames are used in the local request arbitration logic (507 in FIG. 5). They are the elapsed frame counter, which is used to specify how much bandwidth remains in the frame, and the isochronous byte counter, which is used to specify how much isochronous bandwidth remains to be transferred in the frame.

The elapsed frame counter starts, at the beginning of each frame, at a value equal to the number of bytes that can be transferred across the frame (product of the width of the bus in bytes and the number of clock edges in the frame). For example, in a 16-bit, 800 megahertz implementation (data rate), the value of the counter would start out at (1600 bytes per microsecond)×(2 microseconds per frame)=3200. It counts down to zero over the course of the frame, reloads, counts down again, and so forth. When the elapsed-frame counter reaches zero, a new frame is defined to be started. This is true for both sides of the link. When the elapsed frame counter reaches zero, in certain embodiments a new frame (NewFrame) message to is sent across the link to side B, which causes B's elapsed-frame counter to reset.

The isochronous byte counter starts, at the beginning of each frame, at a value equal to the number of isochronous bytes that must be guaranteed to be transferred during the frame. It decrements with each isochronous byte transferred. It is programmed to be slightly higher than the actual maximum isochronous bandwidth of a frame. Shortly after the beginning of each frame, all the isochronous streams make their requests to send data across the bus during the next frame. The requests may be made in the illustrated embodiment within a predetermined time period after the frame starts.

Initially during a frame, asynchronous transfers are granted priority over isochronous transfers (to minimize the latency of the asynchronous transfers), (asynchronous priority mode). However, counter(s) track of how much isochronous traffic passes during the frame and if the isochronous streams are in danger of running out of the required bandwidth for the frame, arbitration priority switches to the isochronous traffic, (isochronous-priority mode). In that way, a minimum amount of isochronous bandwidth can be guaranteed while minimizing latencies for asynchronous transfer requests. After all the isochronous bus cycles for the frame are complete (which occurs before the end of the frame), the priority switches back to the asynchronous traffic.

The bus protocol includes two arbiters: the whole-bus mode arbiter 509 in the protocol layer and the local-request arbiter 507 in the link layer that determines which local requester will next be granted the local half-bus. The local request arbiter operates as follows.

At the beginning of each frame, all isochronous streams that will require bandwidth during the frame request the link from the local-request arbiter. They continue to request the link until they have completed all of their bus cycles for the frame.

It is expected that the total requested bandwidth for the vast majority of frames will be well under 100% and the asynchronous transfers will be granted highest priority for the entire frame. Thus, as described above, asynchronous CPU accesses will most often be granted higher priority than isochronous transfers and therefore incur reduced average latency. In situations where large blocks of bulk asynchronous data are being transferred across the link (for example, from the PCI bus), then the isochronous transfers will tend to come at the end of the frame, after the priority has switched to isochronous bus cycles. In this case, CPU latency will tend to increase as the CPU loses priority to the isochronous bus cycles and contends with the bulk asynchronous transfers.

For each frame, the link either stays in asynchronous priority mode for the entire frame or (1) starts in asynchronous priority mode, (2) transitions to isochronous priority mode during the frame, and (3) then transitions again to asynchronous priority mode before the end of the frame as illustrated in FIG. 4.

The rules for the local-request arbiter are very simple: asynchronous requesters are higher priority than isochronous requesters during asynchronous-priority mode and only isochronous requesters are granted bus cycles during isochronous-priority mode. The arbitration method for the group of asynchronous requesters is not limited other than it is required to be fair and to not cause deadlock situations. The arbitration scheme for the group of isochronous requesters may utilize a fixed priority scheme.

The rules for whole-bus mode arbitration and operation and for entering and exiting whole-bus mode in one embodiment are described below and illustrated in FIGS. 8–11. The change to isochronous priority guarantees that all isochronous bus cycles will complete before the end of the frame.

If the local half-bus is in use for a locally-generated cycle, then arbitration will not take place until that bus cycle is ended. The end of the bus cycle can result from the normal end of the bus cycle or the bus cycle can be halted.

The external transmit controller normally requests whole-bus mode during the address phase of the cycle. If whole-bus mode is not requested, then the local whole-bus mode arbiter will not grant whole-bus mode for the bus cycle. However, this rule changes during isochronous-priority mode (see below). In some embodiments, the request for whole-bus mode can be an explicit bus message. In other embodiments, the request is implicit. For example, an implicit request can be, e.g., any transfer over a particular number of bytes, e.g., 32, which is automatically treated as a request for whole bus mode. If a local half-bus is busy when the request for whole-bus mode is received from the external transmit controller and later becomes idle while the requesting transfer is still active, the local arbiter determines if any other local requesters are present, and if not grants its local half-bus to the external transmit controller.

Figure 8:
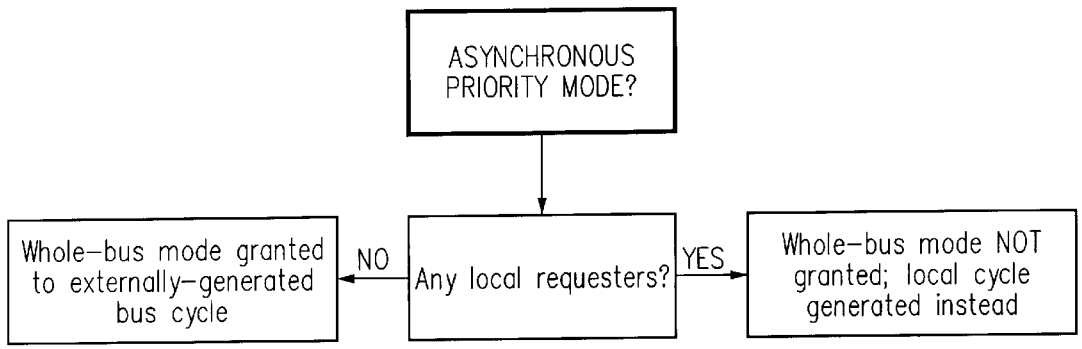
FIG. 8 is a flow diagram illustrating when a local controller should grant whole-bus mode to an external controller when the bus is in asynchronous priority mode.

Referring to FIG. 8, during asynchronous-priority mode, if whole-bus mode is requested by the external side and there are no local requesters for the bus, then whole-bus mode will be granted to the externally generated bus cycle. If, during asynchronous-priority mode, whole-bus mode is requested but there are local requesters, then whole-bus mode will not be granted; the local bus cycle will be granted instead.

Figure 9:
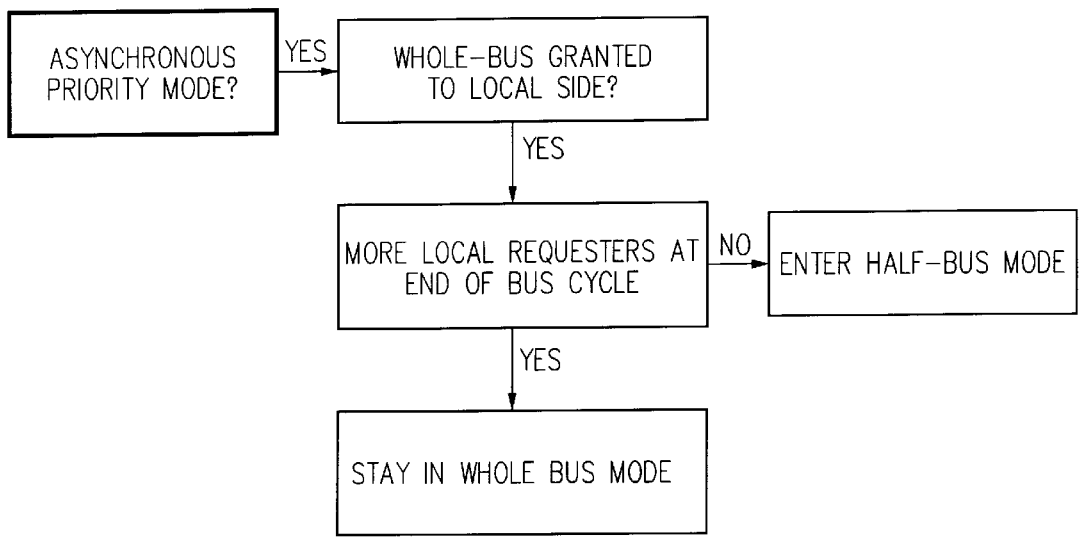
FIG. 9 is a flow diagram illustrating when a local controller should stay in whole-bus mode at the end of a bus cycle when the bus is in asynchronous priority mode.

Referring to FIG. 9, if, during asynchronous-priority mode, whole-bus mode has been granted to the local side and there are more local requesters at the end of the bus cycle, then the bus remains in whole-bus mode for the local requesters' bus cycles. However, if there are no more local requesters, then the link reverts back to half-bus mode at the end of the bus cycle.

Figure 10:
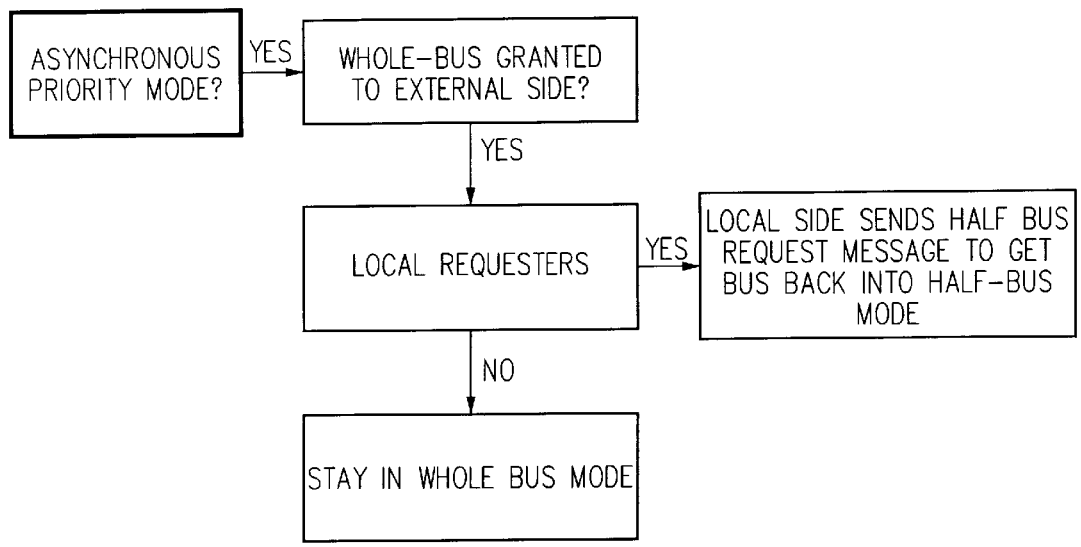
FIG. 10 is a flow diagram illustrating when a local controller stays in whole-bus mode after a whole-bus cycle is granted to the external side.

Referring to FIG. 10, if, during asynchronous-priority mode, whole-bus mode has been granted to the external side and there is a local asynchronous requester, then the local side generates a half-bus request (HalfBusReq) message and the external side is required to place the bus back into half-bus mode.

Figure 11:
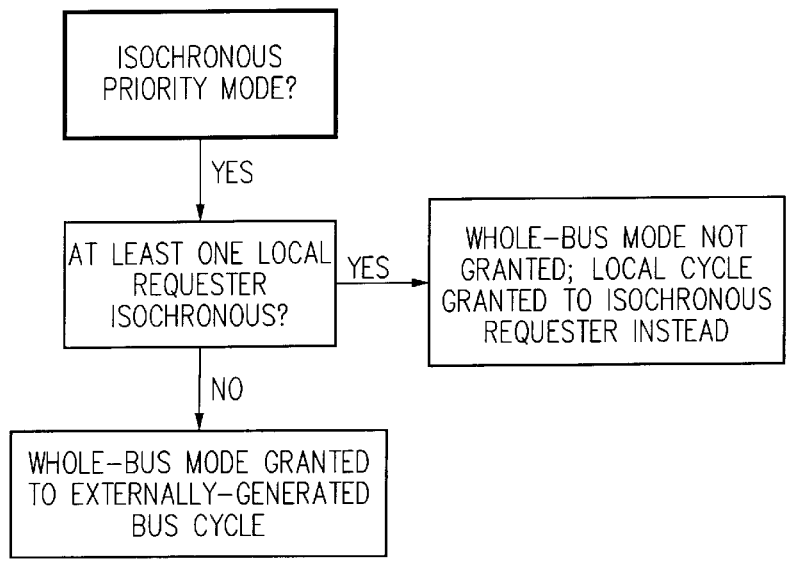
FIG. 11 is a flow diagram illustrating when to grant whole bus mode while the bus is in isochronous priority mode.

Referring to FIG. 11, while in isochronous-priority mode, requests in the address phase of the bus cycle for whole-bus mode are ignored. If, during this mode, there are local isochronous requesters, then whole-bus mode is not granted; the local half-bus is granted to an isochronous requester instead.

If during isochronous-priority mode there are no local isochronous requesters, then whole-bus mode will be automatically granted to the other side of the link. The link will then stay in whole-bus mode, for short and long bus cycles, until the end of the last isochronous bus cycle; after that, the link will return to asynchronous-priority mode. Once in asynchronous-priority mode, the link may or may not stay in whole-bus mode, based on the rules described above.

Figure 12:
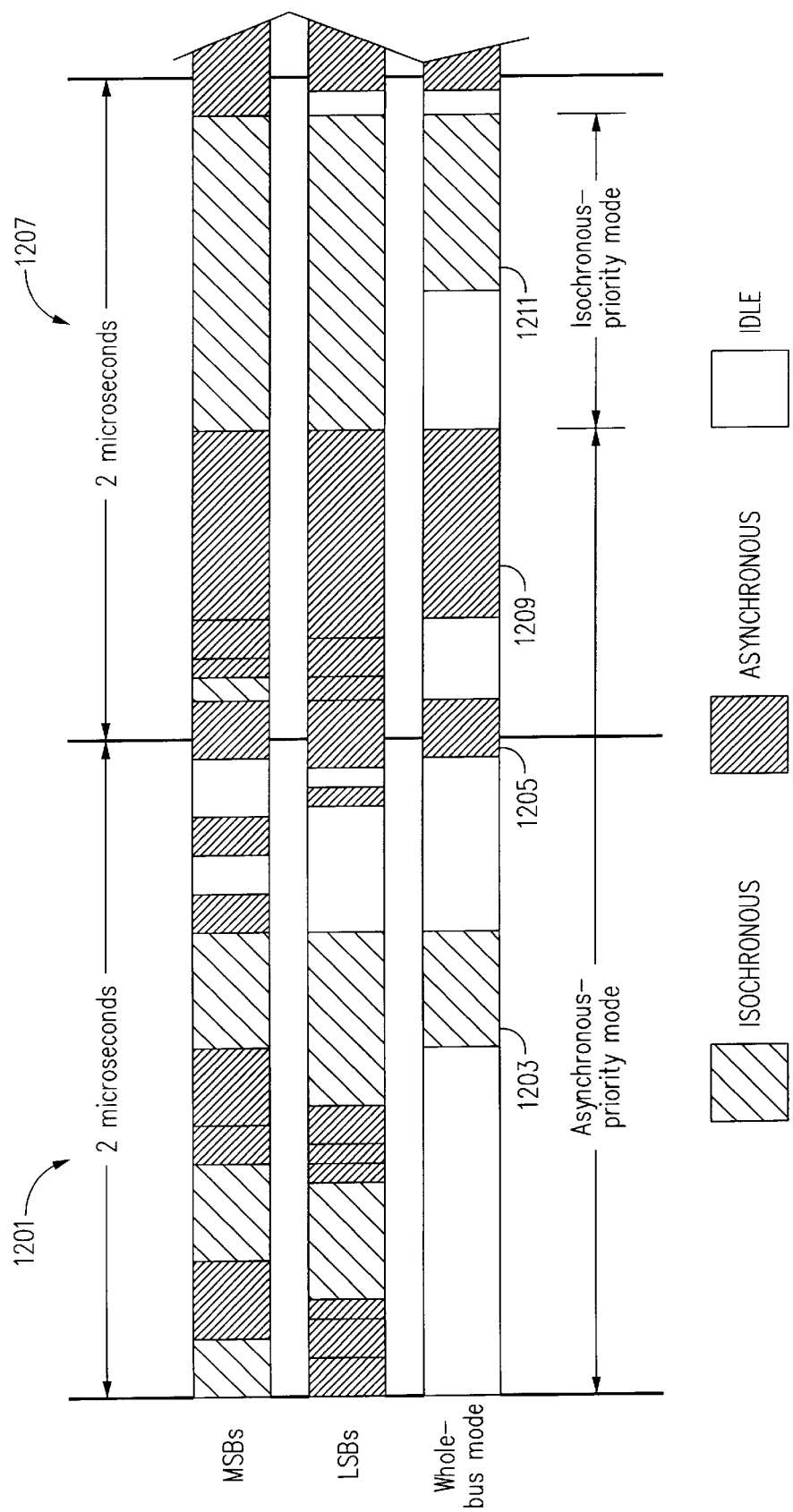
FIG. 12 shows a traffic example including isochronous and asynchronous data and whole and half-bus modes.

FIG. 12 shows a traffic example including isochronous and asynchronous data and whole and half-bus mode. FIG. 12 illustrates how the arbiter optimizes for asynchronous transfers during periods of relatively loose traffic, but when asynchronous traffic dominates, the isochronous bandwidth is still guaranteed. In this example, isochronous bus cycles are assumed to consume slightly more than 50% of the available bandwidth. In the first frame 1201, the isochronous traffic is allowed to occur early, between asynchronous bus cycles because of the lack of asynchronous traffic. At 1203, the bus goes into isochronous whole-bus mode. After isochronous whole bus mode is over, the bus is either idle or transferring asynchronous traffic for the remainder of the frame. At the end of the frame, the bus is in whole-bus mode again except this time, transferring asynchronous data. Note that whole-bus mode may extend across frame boundaries as shown. All the isochronous requesters in frame 1201 complete their bus cycles before getting too close to the end of the frame and thus, isochronous priority mode is unnecessary.

However, in the second frame 1207, the amount of asynchronous traffic has increased to the point where the isochronous bus cycles are in danger of not completing before the end of the frame because of large blocks of asynchronous data. Therefore, the bus enters isochronous-priority mode and the long asynchronous cycle 1209 shown in whole-bus mode is halted. After all the isochronous requesters on one side of the link have completed their bus cycles at 1211, the bus enters into whole-bus mode for the remainder of isochronous-priority mode. Then, after the other side completes all of its remaining isochronous bus cycles in whole-bus mode, the bus is placed back into asynchronous-priority mode. After that, the asynchronous traffic is allowed to continue, through to the next frame.

Figure 13:
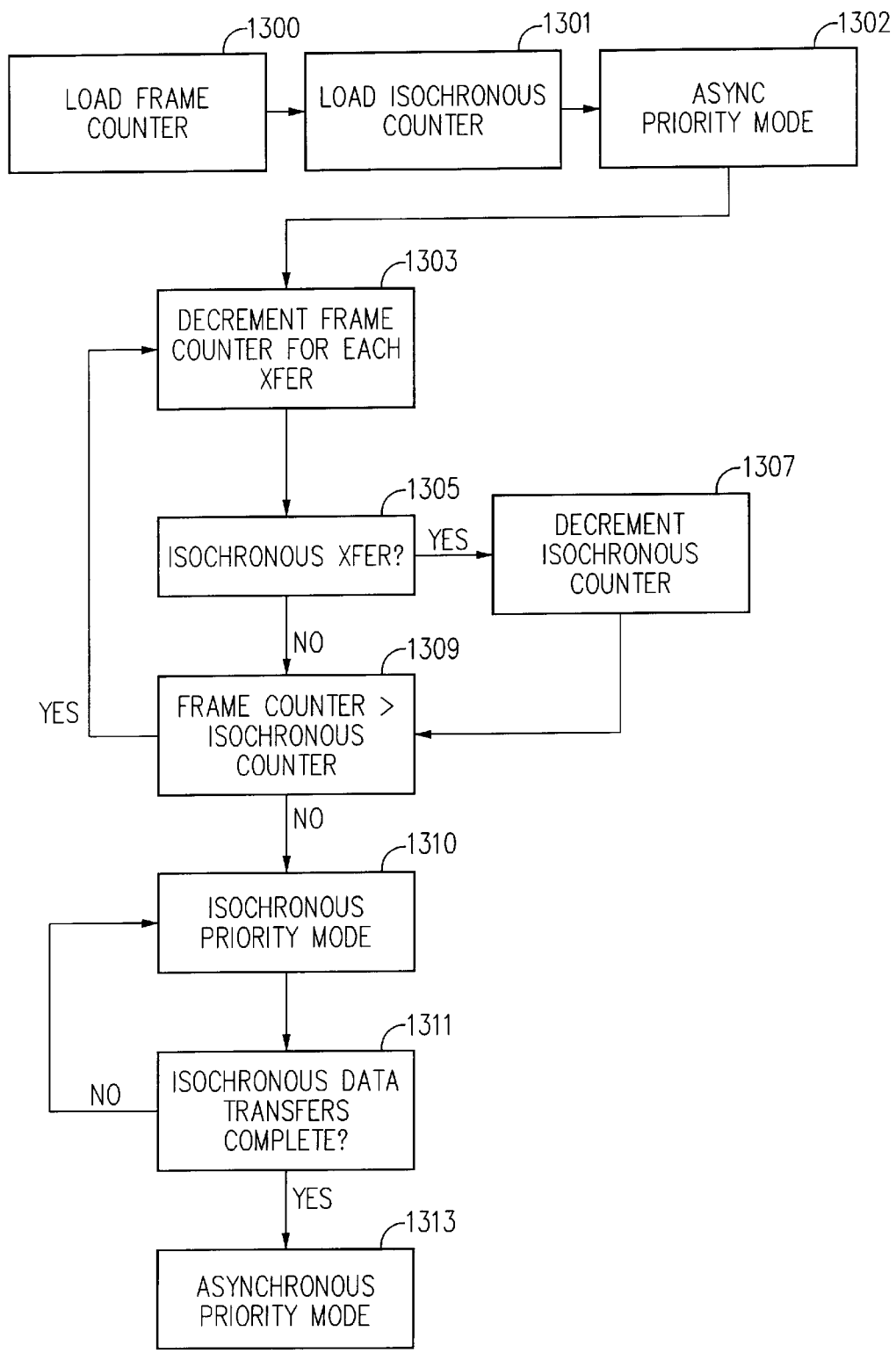
FIG. 13 shows a flow chart for determining when to enter isochronous priority mode.

Referring to FIG. 13, a flowchart illustrates utilization of the frame counter and isochronous byte counter to enter and exit isochronous mode. At the beginning of the frame 1300 the frame counter is loaded with the number of bytes per frame and the isochronous counter is loaded at 1301 with the maximum number of isochronous bytes that can be transferred each frame. At 1302, the frame enters asynchronous priority mode. At 1303 the frame counter is decremented at the data rate for each possible transfer across the bus (whether or not the bus is actually idle). At 1305, it is determined if an isochronous byte was transferred. If so, the isochronous counter is decremented at 1307. At 1309 it is determined if the elapsed-frame counter has passed the isochronous-byte counter. If so, that indicates when the remaining time in the frame is required to be allocated to the isochronous stream to guarantee that the isochronous requests can be serviced during that frame. If the frame counter is still greater than the isochronous counter, then the frame counter is decremented at 1303 on the next clock edge and the loop repeats. If however, there is a need to switch to isochronous mode, the bus switches at 1310. At 1311 it is determined if the isochronous transfers are complete and if so, the bus returns to asynchronous priority mode at 1313.

Thus, at 1309, if there is at least one isochronous requester requiring the bus, then the local hardware will enter isochronous-priority mode. Any side with an isochronous requester or a current isochronous bus cycle will then send an isochronous priority mode (IsoPriMode) message to the other side, so both sides will be in isochronous-priority mode. If there is a bulk asynchronous transfer taking place, it will be halted as illustrated in FIG. 12.

At this point, all isochronous requesters will be granted the bus, one after another, until there are no more isochronous requesters. The last isochronous bus cycle is guaranteed to complete before the end of the frame.

The first side that finishes all its isochronous bus cycles sends the asynchronous priority request (AsyPriReq) message across the bus to indicate that it is ready to enter asynchronous-priority mode. This automatically grants whole-bus mode to the other side. The second side continues isochronous bus cycles in whole-bus mode until they are complete. At this point the second side sends the asynchronous priority grant (AsyPriGnt) message, which places the link into asynchronous-priority mode.

So, to enter isochronous-priority mode, only one side needs to send the isochronous priority mode (IsoPriMode) message. However, to exit back into asynchronous-priority mode a side has to have transmitted the AsyPriReq message and the other side has to have transmitted AsyPriGnt message. If side A sends the IsoPriMode message to side B and side B has no isochronous requesters, then side B immediately responds with the AsyPriReq message. The bus then goes back into asynchronous-priority mode as soon as side A finishes its last isochronous bus cycle and sends out the AsyPriGnt message. In the rare case that side A and side B finish their last isochronous bus cycles at the same time and send out AsyPriReq messages simultaneously, then they will both send out HalfBusAck messages and the link will revert back to half-bus mode and asynchronous-priority mode.

In other embodiments, different approaches are used to ensure that isochronous guarantees are met for each frame. For instance, instead of loading the isochronous byte counter with the maximum possible isochronous byte count each frame, each link interface side could load the isochronous byte counter at the start of each frame with the actual isochronous byte count requested for the frame. That counter is then decremented for each isochronous byte transmitted. When the elapsed frame counter indicates that the time remaining in the cycle was approaching or equal to the value of the isochronous byte counter, the bus switches to the isochronous priority mode to ensure the transfer of the isochronous bytes. Such an approach would require that no more than the maximum allocable isochronous bandwidth was requested each frame. Those of skill in the art will recognize that the counters described as counting down may of course be implemented to count in other ways to determine the count value, e.g., the counters may also be implemented as up counters.

In still another approach, the bus may switch to isochronous priority mode at a predetermined time in the frame and any remaining isochronous transfers are transferred at this time. That approach may increase the latency of asynchronous data somewhat, since there may be no need to switch to isochronous priority mode.

Bus messages are transmitted over the least-significant byte of the data bus (which may vary, based on whether the bus is in whole-bus mode or half-bus mode when the byte is transmitted) while the control signal (CTLA2B, CTLB2A) is asserted. Thus, the control signals are used to send messages. When in half-bus mode or when the local side owns whole-bus mode, assertion of the local control signal indicates that the least-significant byte of the data bus is transmitting a link message. This may happen when the bus is idle or at any time during a bus cycle. The least-significant byte of the bus may vary based on whether the bus is in whole-bus mode or half-bus mode.

If whole-bus mode is granted to the external side, then the local side can assert the control signal (CTLA2B OR CTLB2A) to generate the request for half bus mode (HalfBusReq) message without the benefit of the data bus. This message informs the external side that it must relinquish whole-bus mode, even though it may be in the middle of a bulk transfer. The external side is required to accommodate this request by generating a half bus grant (HalfBusGnt) message, after which the external bus cycle will continue over the external half-bus.

A bus message can be transmitted during any CLK cycle, including when the bus is idle, during the address phase of a transfer, or during the data phase. After the message is transmitted, if there is a bus cycle taking place (and it is not requested to be stopped by the bus message), then the bus cycle will continue on the following CLK cycle, as if it were in suspended animation for a single CLK cycle. Bus messages use all the bytes that are owned by the transmitting side of the link at the time that the message is transmitted. So if the bus is in half-bus mode, the message will be placed on the least-significant byte of the local half-bus; if it is whole-bus mode then it will be placed on the least-significant byte of the whole bus.

The bus messages for one embodiment are described in Table 2

TABLE 2

| Bus messages | Description |
| --- | --- |
| NewFrame | This is used to indicate the beginning of a new frame. |
| IsoPriMode | Enter isochronous-priority mode. The generation of this message, from either or both sides, places both sides into isochronous-priority mode. |
| AsyPriReq | Request to enter asynchronous-priority mode and grant whole-bus mode. This message is sent by the first side to finish transmitting local isochronous bus cycles while in isochronous-priority mode. After the local side transmits the AsyPriReq message, it automatically places the local half-bus into high-impedance mode and enters whole-bus mode. In the rare case that each side both transmits and receives the AsypriReq message (simultaneously), then it automatically sends the HafBusAck message and goes back into half-bus mode (both sides will do this) and the link reverts back to asynchronous-priority mode. |
| AsyPriGnt | Grant asynchronous priority mode. This message is transmitted by the second side to finish transmitting local isochronous bus cycles while in isochronous-priority mode. A side determines that it is the second side to finish transmitting isochronous traffic if it has received the AsyPriReq message while in isochronous-priority mode. The AsyPriGnt message places the link into asynchronous-priority mode on the following clock. |
| HaltXfer | Halt the current bulk transfer in progress. The bus cycle that is in progress is immediately stopped by this message. |
| WholeBusGnt | Whole-bus mode grant. This is sent from the side granting whole-bus mode to the side requesting whole bus mode. After it is sent by the local side, the local side places its half-bus into high-impedance mode. |
| WholeBusAck | Whole-bus mode acknowledge. This is sent from the side requesting whole-bus mode, after the other side has sent either the WholeBusGnt or the AsyPriReq message, to indicate that data will be transferred over the whole bus starting on the following clock. The link is still considered to be in half-bus mode while this message is being transmitted. |
| HalfBusReq | When the external side has been granted whole-bus mode, the local side requests that the link be placed back into half-bus mode by asserting the CTL pin for one CLK cycle. Since the local side controls no data bus pins, there is no decode for this message. |
| HalfBusGnt | The owner of whole-bus mode sends this message in response to the HalfBusReq message to indicate that it is reverting back into half-bus mode. On the clock following this message, the link is considered to be in half-bus mode. |

TABLE 2-continued

| Bus messages | Description |
| --- | --- |
| HalfBusAck | When the external side owns whole-bus mode and it is ended (by a HalfBusGnt, HaltXfer, or an EndXfer), then this message is sent by the local side to indicate that it is back in control of the half-bus. |

In addition to the message above, bus messages may be used for legacy signal transfers. Legacy signals are those signals in personal computer (or other) systems that are necessitated by the desire to ensure compatibility with older designs. Thus, the interface module may need to transmit legacy signal information to the processor module. In one embodiment bits(3:0) of the message are used to transmit the legacy signals STPCLK#, IGNNE#, CPURST, A20M#. Those legacy signals are known in the art and are not discussed further herein. The interface module (IM) transmits this data each time one of those signals change state.

Further, bus messages may be used to transfer interrupt signals states from the interface module to the processor module. For this bus message bits(3:0) are used to transfer interrupts SMI, NMI, INTR, INIT. The interface module transmits this data each time one of these signals change state.

Finally, legacy information may be needed to be transferred from the processor module to the interface module. For example, FERR# may be transferred in a specific bit position of a bus message. The processor module transmits this data each time one of the signals changes state.

If transferring of legacy information conflicts unduly with whole-bus mode and/or isochronous-priority mode operations, separate signals may be utilized in the computer system for transferring some or all of the legacy and interrupt signals between the processor module and the interface module.

As discussed above, certain situations result in the halt of a bus cycle. For instance, while in asynchronous-priority mode, if a bulk isochronous transfer is taking place and there is an asynchronous requester, then the transfer will be halted to minimize the latency of the asynchronous bus cycle. After entering isochronous-priority mode, if a bulk asynchronous transfer is taking place, it will be halted. The bus is then only granted to isochronous requesters during isochronous-priority mode.

Bus cycles are not halted during their address phase, only during their data phase. The requester of a halted bus cycle continues to request the cycle. Once it is granted again, data continues from the point where it left off.

Figure 14:
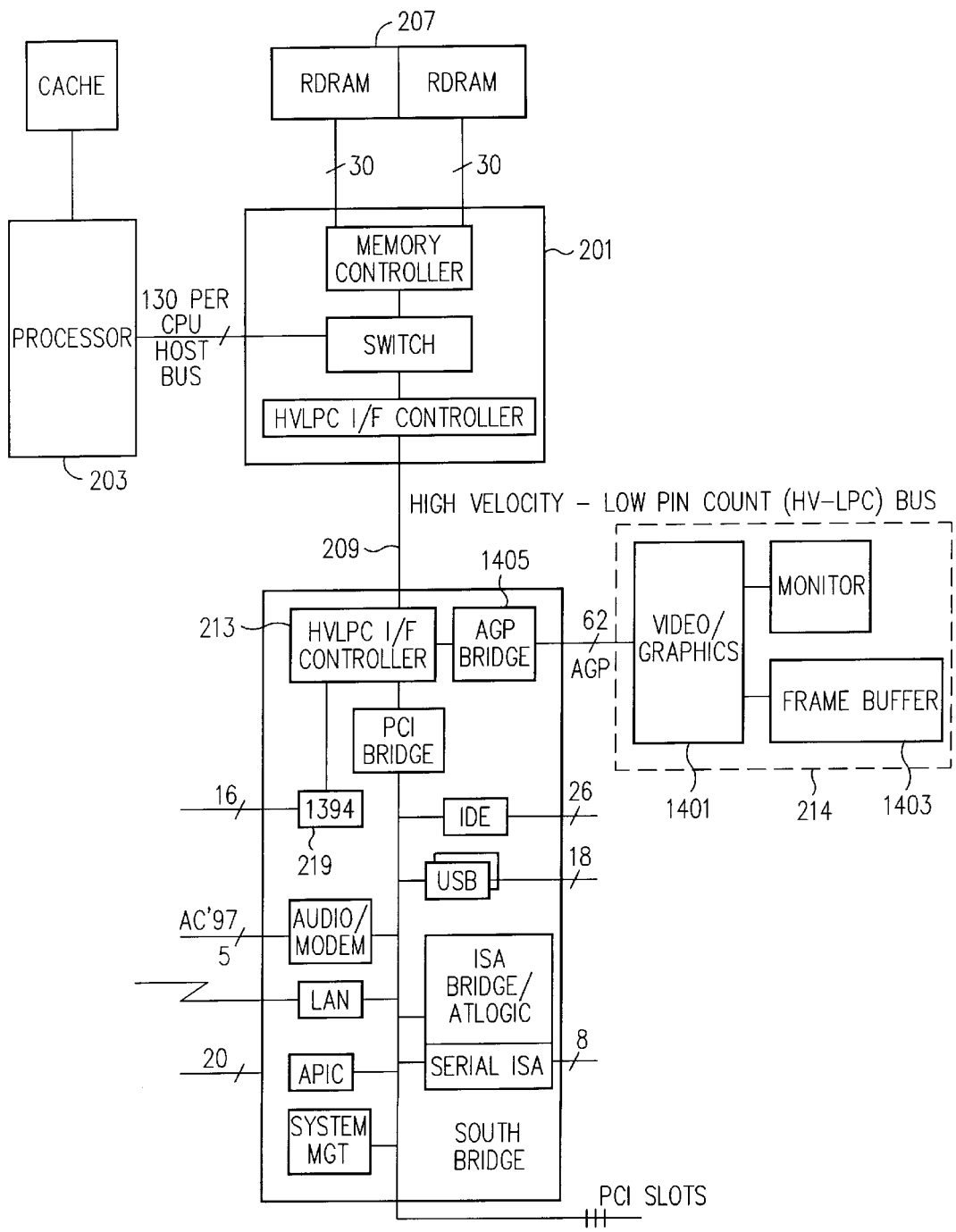
FIG. 14 shows a computer system in which the graphics subsystem is coupled to the south bridge.

Now that the interconnect bus is understood, various computer system architectures exploiting features of the bus may be further examined. Another architectural variant of FIG. 2 is shown in FIG. 14. In this embodiment, graphics subsystem 214 has been moved from north bridge 210 to south bridge 211. That significantly reduces the pin count of the north bridge integrated circuit. Reduced pin count generally results in lower cost. That also allows data to be routed to the graphics subsystem 214 directly from 1394 host controller 219. Thus, e.g., data from a video camera (not shown) could be routed directly through the HVLPC interface controller 213 through AGP bridge 1405 to graphics subsystem 214.

In still another option (not shown), the graphics controller 1401 of graphics subsystem 214 may be located in south bridge 211.

With the graphics bus and/or the graphics controller integrated into south bridge 211, certain graphical functions may remain in the north bridge 201. When the graphics port being used is the accelerated graphics port (AGP), the AGP lets the video processor in video/graphics controller 1401 access system memory 207 for graphics calculations. Graphics controllers typically access contiguous data structures in their local memory (frame buffer 1403) but if the data structures are stored in system memory, the structures can be dynamically allocated. Therefore the graphics controller needs to remap local memory addresses to system memory. The Graphics Address Remapping Table (GART) remaps addresses from the local memory for the graphics controller to the system memory. It is more convenient if that function is maintained close to the memory and therefore still resides in north bridge 201 in the embodiment described in FIG. 14.

Figure 15:
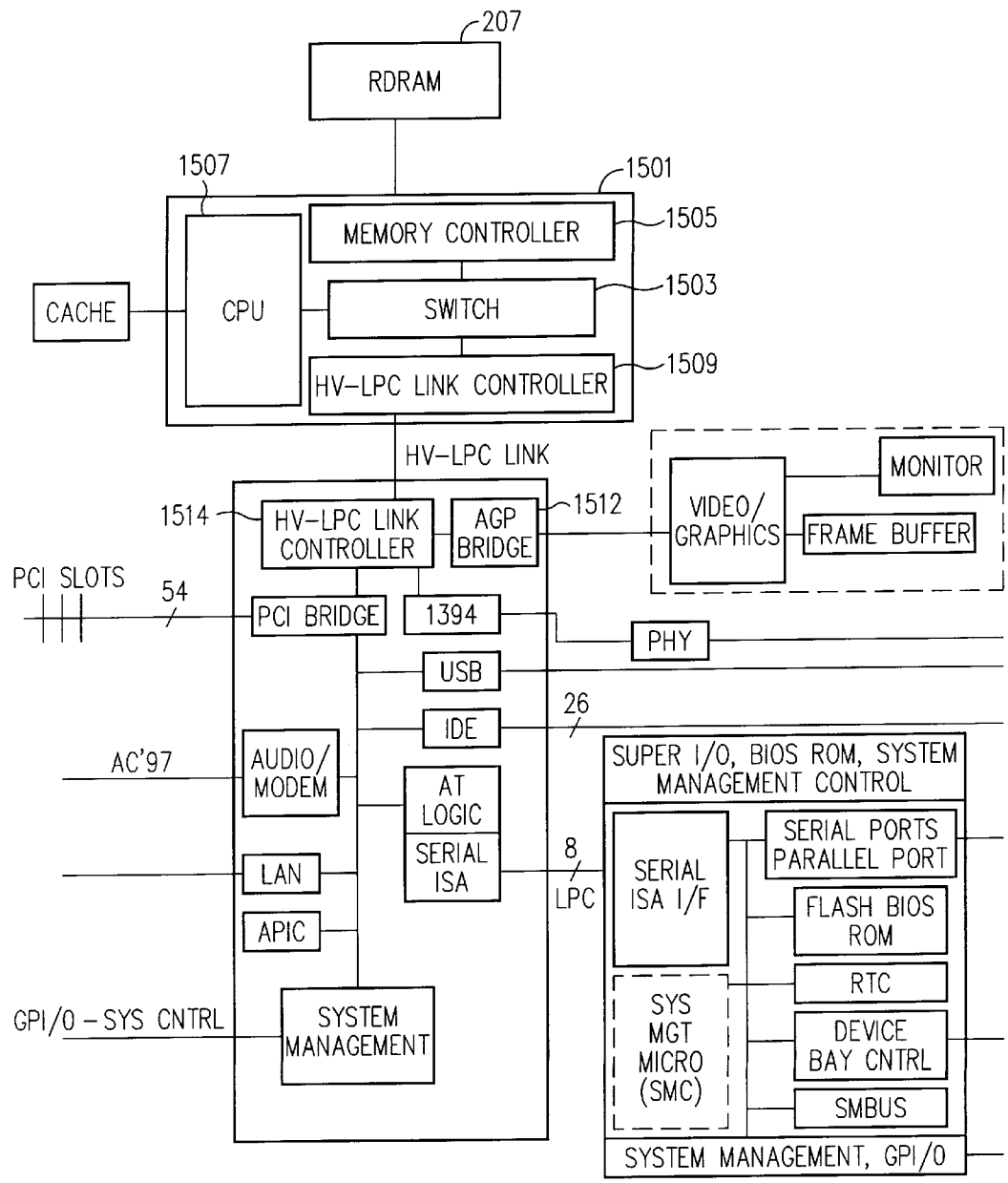
FIG. 15 shows a computer system in which the processor and the north bridge have been integrated into a single integrated circuit which is coupled to the south bridge via the interconnection bus.

Referring to FIG. 15 another implementation exploiting the interconnection bus is shown in which the north bridge and the CPU are integrated together into a single integrated circuit 1501. That integration significantly reduces the pin count of the processor integrated circuit that incorporates the CPU. The reduction in pin count results from the removal of the bus interface, e.g. the Socket 7 bus which is shown in FIG. 14 as the host bus. A three port switch 1503 in CPU integrated circuit 1501 connects the memory controller 1505, CPU 1507, and the HV-LPC bus interface controller 1509. Note that the memory controller may include a Rambus controller to interface to system memory using RDRAM.

Assuming the memory interface is a low pin count interface such as Rambus or Sinclink, and given the low pin count of the HV-LPC interconnection bus, the total pin count of the system is reduced which results in a reduction in cost. For example, one architecture in use today uses a 321-pin CPU and a 328-pin north bridge chip. Where the north bridge is integrated with the CPU, the entire north bridge/CPU function can be reduced to a single integrated circuit with less than 328 total pins. Thus, the embodiment of FIG. 15 has eliminated an entire integrated circuit. In addition, the reduction in pins results in further savings caused by saving board space and routing.

In FIG. 15, the AGP bridge 1512 is coupled to the link controller 1514. The graphics controller can communicate with system memory through the interconnection bus. Additionally, the 1394 bus can communicate directly with AGP bridge 1512 through the link controller without going through system memory (RDRRAM first). That reduces traffic on the bus and ensures isochronous data is provided to its ultimate destination more quickly than if the isochronous data had to be stored first in system memory 207 using memory controller 1505.

Figure 16:
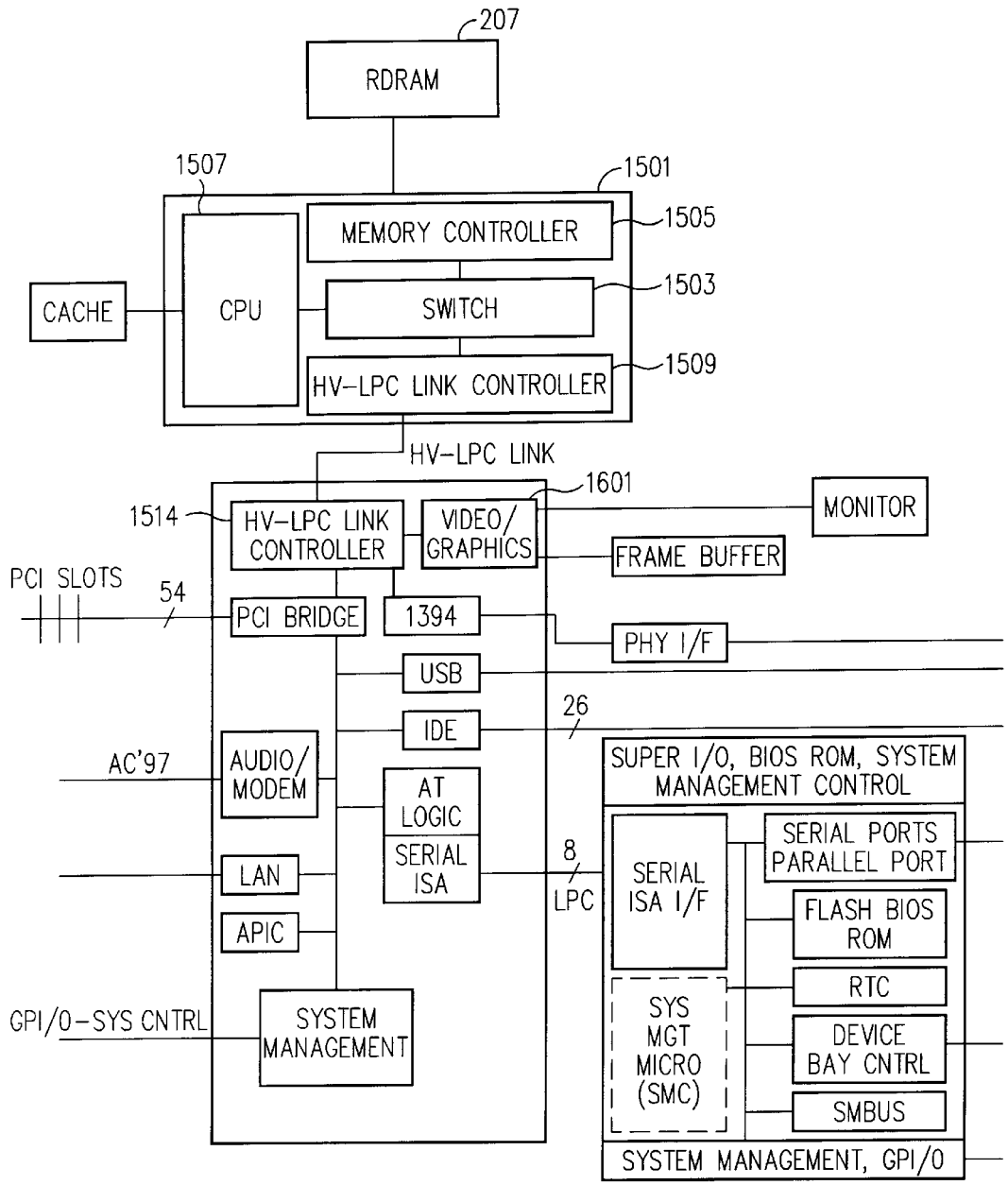
FIG. 16 shows a computer system having an integrated processor and memory controller, which is coupled via the interconnection bus to the south bridge which has an integrated graphics controller function.

Referring to FIG. 16, another embodiment is shown in which the video/graphics controller 1401 is integrated with the South Bridge integrated circuit and connected to link controller 1514. As data intensive applications grow, the throughput and latency demands on the interconnect bus will also grow. Therefore, it is important that the interconnect bus described herein supports high bandwidth asynchronous and isochronous data for both present and future applications. Note that placing the graphics controller in the south bridge or attached to the south bridge and using the same interconnect bus for the graphics data as well as other input/output system data, can place heavy throughput and latency requirements on the interconnect bus.

Figure 17:
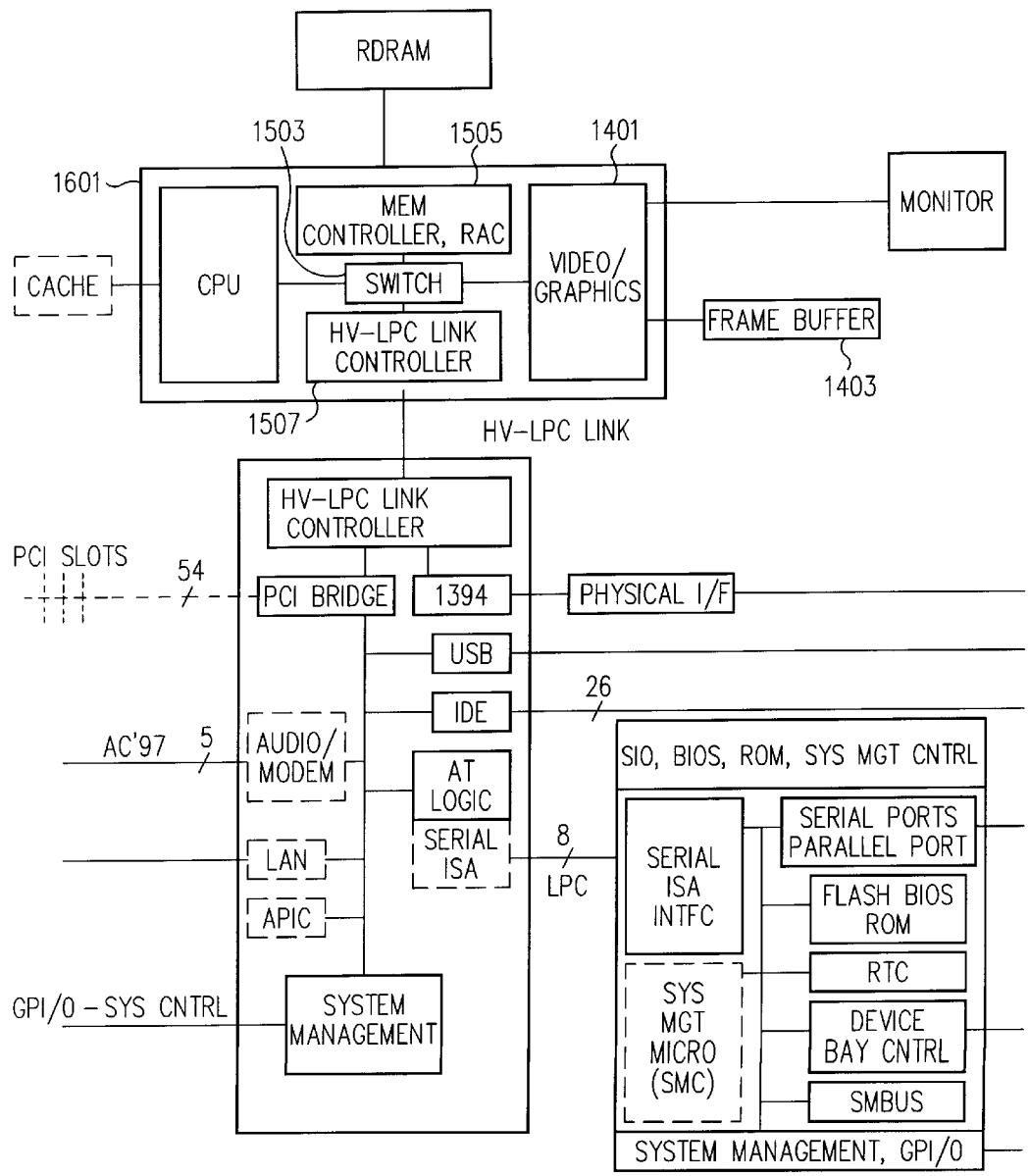
FIG. 17 shows a computer system having an integrated processor and memory controller and graphics controller, which is coupled via the interconnection bus to the south bridge.

Referring to FIG. 17, another embodiment is shown in which the video/graphics controller 1401 is integrated with the CPU, memory controller and the interconnect bus controller in integrated circuit 1701. Integrating the graphics controller on the integrated circuit that includes the processor core provides the advantage of greater system integration resulting in the elimination of a separate graphics controller circuit.

Further pin savings can be effected by utilizing a unified memory architecture (UMA) in which the system RAM (e.g. RDRAM 207) is used in place of frame buffer 1403. The frame buffer 1403 is a memory holding the video image and is typically found on graphic boards. Typically, computer systems have provided the graphics controller on a separate graphics card. Utilizing UMA results in a lower pin count because the interface from CPU integrated circuit 1701 to frame buffer 1403 is eliminated. However, that comes at the expense of system performance because all of the graphics controller to frame buffer data traffic is handled by system memory in the UMA approach.

Note that in some embodiments, it may be necessary to provide sideband signal(s) directly from the south bridge integrated circuit to the processor when the latency guaranteed on the HV-LPC is too long for certain functions that have shorter requirements. For example, if power management in the south bridge knows that the processor is going to have its clocks shut down in 100 nanoseconds, the latency inherent with the interconnection bus may too long to inform the processor prior to the event, thus necessitating the sideband signal(s).

The description of the invention set forth herein is illustrative, and is not intended to limit the scope of the invention as set forth in the following claims. Variations and modifications of the embodiments disclosed herein, may be made based on the description set forth herein, without departing from the scope and spirit of the invention as set forth in the following claims.

What is claimed is:

1. A computer system comprising:
   a processor integrated circuit including a central processing unit;
   a first integrated circuit coupled by a host bus to the processor integrated circuit;
   a second integrated circuit; and
   an interconnection bus coupling the first and second integrated circuits, the interconnection bus transferring data in frames, the interconnection bus coupled to transfer data in asynchronous priority mode during a first part of each frame, in which asynchronous traffic is transferred instead of isochronous traffic if there are any asynchronous requesters for the interconnection bus and to transfer data in isochronous priority mode during other parts of at least some frames.

2. The computer system as recited in claim 1 wherein the second integrated circuit includes a bridge circuit coupling the interconnection bus to a peripheral component interface (PCI) bus.

3. The computer system as recited in claim 2 wherein the second integrated circuit includes a serial interface circuit coupling a serial bus transferring at least some isochronous data, to the second interconnection bus interface circuit.

4. The computer system as recited in claim 3 wherein the serial bus is an IEEE 1394 compatible bus.

5. The computer system as recited in claim 1 wherein the interconnection bus transfers data simultaneously in two directions between the first and second integrated circuits.

6. The computer system as recited in claim 5 further comprising a switch circuit coupled to the host bus, for selectably coupling the system memory, the processor integrated circuit, and the interconnection bus.

7. The computer system as recited in claim 1 further comprising system memory coupled to the first integrated circuit, the system memory including random access memory (RAM) devices and wherein the first integrated circuit includes a memory controller for the system memory.

8. The computer system as recited in claim 7 further comprising:
   a graphics controller circuit coupled to the first bridge integrated circuit via a graphics bus.

9. The computer system as recited in claim 8 further comprising a switch circuit coupled to the graphics bus, the host bus, the first interconnection bus interface circuit, and the system memory, the switch circuit for selectably coupling the system memory to one of the processor integrated circuit, the interconnection bus and the graphics bus, the switch also selectably coupling the processor integrated circuit to the interconnection bus.

10. The computer system as recited in claim 1 further comprising:
    a graphics controller circuit; and
    a graphics bus connecting the graphics controller circuit to the second bridge interface circuit.

11. The computer system as recited in claim 1 further comprising a graphics controller circuit integrated on the second bridge integrated circuit.

12. A method of communicating information in a computer system that includes a processor coupled to a first bridge integrated circuit by a host bus and an interconnection bus connecting a second bridge integrated circuit to the first bridge integrated circuit, the method comprising:
    transferring information between the first and second bridge integrated circuits in asynchronous priority mode in which asynchronous information is transferred instead of isochronous information if there are any asynchronous requesters, during a first part of each frame;
    selectably transferring information between the first and second bridge integrated circuits in isochronous priority mode, in which transfer of isochronous information is given priority over transfers of asynchronous information.

13. The method as recited in claim 12 further comprising:
    sending a message regarding impending power states over the interconnection bus.

14. The method as recited in claim 12 further comprising sending interrupt requests to the processor on the interconnection bus.

15. The method as recited in claim 12 further comprising communicating impending clock stoppages via messages sent over the interconnection bus.

16. The method as recited in claim 12 further comprising:
    transferring data between the first bridge integrated circuit and a 1394 bus via the interconnection bus using isochronous priority mode.

17. The method as recited in claim 12 further comprising selectably coupling via a switching circuit, a main memory coupled to the first bridge integrated circuit, to one of the processor and the interconnect bus; and
    selectably coupling the processor via the switching circuit to one of the main memory and the interconnect bus.

18. The method as recited in claim 17 further comprising selectably coupling a graphics controller via the switching circuit to the main memory.

19. The method as recited in claim 12 further comprising transferring isochronous data from a serial bus coupled to the second integrated circuit to the graphics controller, without storing the isochronous data in system memory.

20. The method as recited in claim 12 further comprising:

transferring data between the first bridge integrated circuit and devices resident on a peripheral component interface (PCI) bus via the interconnection bus in the asynchronous priority mode; and transferring data between the first bridge integrated circuit and a 1394 bus via the interconnection bus using the isochronous priority mode.

21. An integrated circuit comprising:

a plurality of input and output terminals for connecting to an interconnection bus;

an interface coupled to the input and output terminals, the interface coupled to send and receive data in frames, the interface responsive to transfer information in asynchronous priority mode during a first part of a frame and in isochronous priority mode during other parts of the frame, the interconnect bus selectably switching to isochronous priority mode during the frame according to an amount of isochronous traffic transferred during the frame.

22. The integrated circuit as recited in claim 21 wherein the integrated circuit includes a memory controller and is coupled to a microprocessor via a host bus.

23. The integrated circuit as recited in claim 21 wherein the integrated circuit includes a bridge circuit to couple the interconnection bus to a peripheral component interconnect (PCI) bus.

24. The integrated circuit as recited in claim 21 wherein the interconnect bus switches to isochronous priority mode according to the amount of isochronous traffic transferred during asynchronous priority mode.

* * * * *